(12) United States Patent
Stahl et al.

(10) Patent No.: US 12,445,337 B2
(45) Date of Patent: Oct. 14, 2025

(54) COMMUNICATION DEVICE AND OPERATING METHOD

(71) Applicant: NXP B.V., Eindhoven (NL)

(72) Inventors: Johannes Stahl, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 250 days.

(21) Appl. No.: 17/647,397

(22) Filed: Jan. 7, 2022

(65) Prior Publication Data
US 2022/0231897 A1   Jul. 21, 2022

(30) Foreign Application Priority Data

Jan. 18, 2021   (EP) ..................................... 21152199

(51) Int. Cl.
| | |
|---|---|
| H04L 27/26 | (2006.01) |
| H04B 5/45 | (2024.01) |
| H04B 17/30 | (2015.01) |
| H04L 25/02 | (2006.01) |
| H04L 27/00 | (2006.01) |
| H04B 5/20 | (2024.01) |

(52) U.S. Cl.
CPC ........... *H04L 27/2657* (2013.01); *H04B 5/45* (2024.01); *H04B 17/30* (2015.01); *H04L 25/0202* (2013.01); *H04L 27/0014* (2013.01); *H04B 5/20* (2024.01); *H04L 2027/0038* (2013.01)

(58) Field of Classification Search
CPC ............. H04L 27/2657; H04L 25/0202; H04L 27/0014; H04B 17/30
USPC .......................................................... 370/252
See application file for complete search history.

(56) References Cited

U.S. PATENT DOCUMENTS

| | | | |
|---|---|---|---|
| 9,171,440 B2 * | 10/2015 | Frederick | G08B 13/2448 |
| 9,646,299 B1 | 5/2017 | Rezayee et al. | |
| 10,680,664 B2 * | 6/2020 | Choi | H04B 1/04 |

(Continued)

FOREIGN PATENT DOCUMENTS

| | | |
|---|---|---|
| EP | 2770755 A1 | 8/2014 |
| EP | 3337050 A1 | 6/2018 |
| EP | 3667934 A1 | 6/2020 |

OTHER PUBLICATIONS

Lukacs, Mathew W. et al.; ""RF-DNA" Fingerprinting for Antenna Classification", IEEE Antennas and Wireless Propagation Letters; vol. 14; Mar. 10, 2015; DOI: 10.1109/LAWP.2015.2411608.

(Continued)

*Primary Examiner* — Faruk Hamza
*Assistant Examiner* — Jean F Voltaire

(57) ABSTRACT

In accordance with a first aspect of the present disclosure, a communication device is provided, comprising: a receiver configured to receive one or more signals from an external communication device; a classifier configured to classify the external communication device using the signals received by the receiver and to output a corresponding classification result; and a processing unit configured to change one or more configuration settings of the communication device in dependence on the classification result. In accordance with a second aspect of the present disclosure, a corresponding method of operating a communication device is conceived. In accordance with a third aspect of the present disclosure, a corresponding computer program is provided.

20 Claims, 6 Drawing Sheets

(56) References Cited

U.S. PATENT DOCUMENTS

| | | | |
|---|---|---|---|
| 2013/0225071 A1* | 8/2013 | Royston | G06K 7/10128 455/41.1 |
| 2014/0341056 A1* | 11/2014 | Carbajal | H04W 24/08 370/252 |
| 2017/0026088 A1* | 1/2017 | Cho | H04B 5/263 |
| 2017/0255938 A1 | 9/2017 | Biegun et al. | |
| 2018/0034621 A1 | 2/2018 | Hueber et al. | |

OTHER PUBLICATIONS

U.S. Appl. No. 17/452,806, filed Oct. 29, 2021; Inventors: Johannes Stahl et al.; Title: "Phase Value Determination for an NFC Card Emulating Device Utilizing Active Load Modulation".

\* cited by examiner

COMMUNICATION DEVICE AND OPERATING METHOD

CROSS-REFERENCE TO RELATED APPLICATIONS

This application claims priority under 35 U.S.C. § 119 to European Patent Application No. 21152199.2, filed on Jan. 18, 2021, the contents of which are incorporated by reference herein.

TECHNICAL FIELD

The present disclosure relates to a communication device. Furthermore, the present disclosure relates to a corresponding method of operating a communication device, and to a corresponding computer program.

BACKGROUND

Radio frequency (RF) communication devices are widely used. Examples of RF communication devices are near field communication (NFC) devices and radio frequency identification (RFID) devices. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder or an active card emulation device, for example, which may be referred to as a proximity integrated circuit card (PICC). The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

SUMMARY

In accordance with a first aspect of the present disclosure, a communication device is provided, comprising: a receiver configured to receive one or more signals from an external communication device; a classifier configured to classify the external communication device using the signals received by the receiver and to output a corresponding classification result; and a processing unit configured to change one or more configuration settings of the communication device in dependence on the classification result.

In one or more embodiments, the configuration settings include at least one of the group of modem settings, equalizer initialization settings and decoder settings.

In one or more embodiments, the classifier is configured to classify the external communication device and the processing unit is configured to change the configuration settings within a period during which a first command message is received from the external communication device in accordance with a predefined communication protocol.

In one or more embodiments, the classifier is configured to classify the external communication device and the processing unit is configured to change the configuration settings within a period during which a preamble and a synchronization code of the first command message are received.

In one or more embodiments, the classifier is configured to classify the external communication device by extracting one or more signal characteristics from the received signals and by assigning a predefined class to the external communication device based on said signal characteristics.

In one or more embodiments, the signal characteristics include a received signal strength indicator.

In one or more embodiments, the signal characteristics include a ratio of upper side band to lower side band subcarrier frequency amplitudes.

In one or more embodiments, the signal characteristics include a ratio of an amplitude of a subcarrier signal to an amplitude of the third harmonic of said subcarrier signal.

In one or more embodiments, the configuration settings are stored in a look-up table within the communication device.

In one or more embodiments, the communication device is a proximity integrated circuit card or a proximity integrated circuit card emulating device.

In accordance with a second aspect of the present disclosure, a method of operating a communication device is conceived, the communication device comprising a receiver, a classifier and a processing unit, and the method comprising: receiving, by the receiver, one or more signals from an external communication device; classifying, by the classifier, the external communication device using the signals received by the receiver and outputting a corresponding classification result; and changing, by the processing unit, one or more configuration settings of the communication device in dependence on the classification result.

In one or more embodiments, the configuration settings include at least one of the group of modem settings, equalizer initialization settings and decoder settings.

In one or more embodiments, the classifier classifies the external communication device and the processing unit changes the configuration settings within a period during which a first command message is received from the external communication device in accordance with a predefined communication protocol.

In one or more embodiments, the classifier classifies the external communication device and the processing unit changes the configuration settings within a period during which a preamble and a synchronization code of the first command message are received.

In accordance with a third aspect of the present disclosure, a computer program is provided, comprising executable instructions which, when executed by a communication device, cause said communication device to carry out a method of the kind set forth.

DESCRIPTION OF DRAWINGS

Embodiments will be described in more detail with reference to the appended drawings, in which.

DESCRIPTION OF EMBODIMENTS

As mentioned above, radio frequency (RF) communication devices are widely used. Examples of RF communication devices are near field communication (NFC) devices and radio frequency identification (RFID) devices. Typically, an NFC system or an RFID system includes a reader device—sometimes referred to as a reader, an interrogator or a proximity coupling device (PCD)—which generates a high-frequency radio field, and a passive or active communication counterpart. The communication counterpart may be a passive transponder or an active card emulation device, for example, which may be referred to as a proximity integrated circuit card (PICC). The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

Reliable communication between near field communication (NFC) enabled devices (e.g., mobile phones) and NFC reader terminals is of utmost importance. In particular, any failed communication cycle between a proximity coupling device (PCD) and a proximity integrated circuit card (PICC) or a proximity integrated circuit card emulating device (PICCED) results in a delay that affects the overall user experience and may possibly cause standard incompliance. It is noted that a PICC typically takes the form of a physical card (e.g., a smart card), while a PICCED is a device which emulates such a card. It is furthermore noted that a PICC and a PICCED may be able to perform the same or similar functions.

Now discussed are a communication device, a corresponding method of operating a communication device and a corresponding computer program, which facilitate reducing the risk of failed communication cycles, and thus facilitate increasing the reliability of the communication between a PCD and a PICC or a PICCED of the kind set forth.

Figure 1:
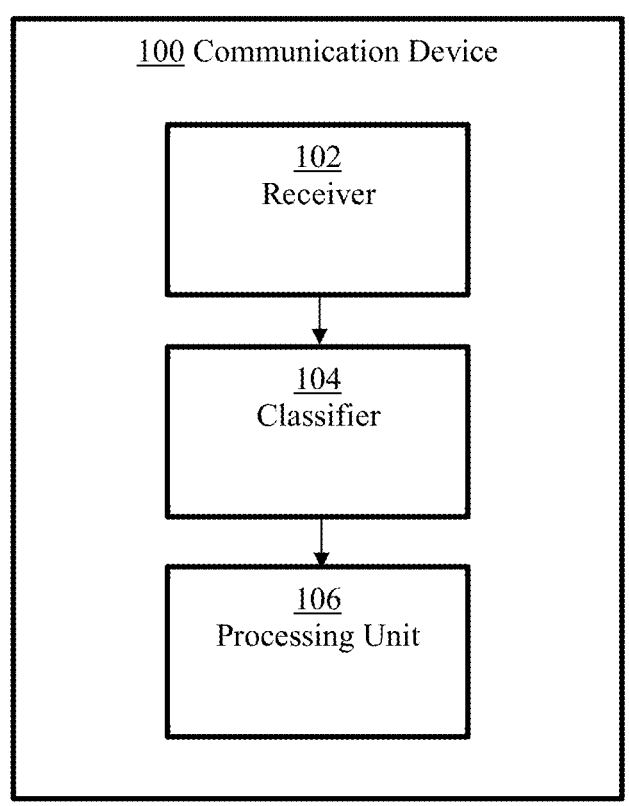
FIG. 1 shows an illustrative embodiment of a communication device.

FIG. 1 shows an illustrative embodiment of a communication device 100. The communication device 100 includes a receiver 102, a classifier 104 and a processing unit 106. The receiver 102 is configured to receive one or more signals from an external communication device (not shown). Furthermore, the classifier 104 is configured to classify the external communication device using the signals received by the receiver and to output a corresponding classification result. Furthermore, the processing unit 106 is configured to change one or more configuration settings of the communication device 100 in dependence on the classification result. In this way, the communication device 100 can easily be configured in dependence of the type of external communication device with which communication is established. This, in turn, facilitates reducing the risk of failed communication cycles, and thus facilitates increasing the reliability of the communication between the two devices. In a practical implementation, the communication device 100 is a proximity integrated circuit card (PICC) or a proximity integrated circuit card emulating device (PICCED). In that case, the external communication device is a proximity coupling device (PCD) or, in other words, a reader. It is noted that, although the classifier 104 and the processing unit 106 are shown as separate components, they may also be integrated into a single physical component of the communication device 100. Furthermore, it is noted that the term "external" refers to the fact that the external communication device is external to, i.e. does not form part of, the communication device 100.

In one or more embodiments, the configuration settings include at least one of the group of modem settings, equalizer initialization settings and decoder settings. By changing these specific types of settings in dependence on the class of external communication device, the reliability of the communication may be further increased. In one or more embodiments, the classifier is configured to classify the external communication device and the processing unit is configured to change the configuration settings within a period during which a first command message is received from the external communication device in accordance with a predefined communication protocol. In this way, the configuration settings may be adapted for an entire communication session performed in accordance with said protocol, which further increased the reliability of the communication. In particular, the first command may be a first command of a communication session between the communication device and the external communication device, or, in other words, a command that initiates such a communication session. An example of such a first command is a polling command. When the FeliCa protocol is used, the polling command may be a so-called wakeup request (WUP-REQ) command. It is noted that FeliCa (Felicity Card) refers to a contactless RFID smart card system, which is primarily used in electronic money cards. The skilled person will appreciate that other communication protocols may also use polling commands of the kind set forth, in particular as first commands of a communication session. Accordingly, the presently disclosed embodiments are not limited to the FeliCa protocol. In a practical implementation, the classifier is configured to classify the external communication device and the processing unit is configured to change the configuration settings within a period during which a preamble and a synchronization code of the first command message are received. In this way, a reader command portion of said first command message may already be received under optimized conditions, in particular with optimized receiver settings.

In one or more embodiments, the classifier is configured to classify the external communication device by extracting one or more signal characteristics from the received signals and by assigning a predefined class to the external communication device based on said signal characteristics. In this way, the classification of the external communication device can easily be implemented. In one or more embodiments, the signal characteristics include a received signal strength indicator (RSSI). The RSSI is a signal characteristic that may easily be extracted and processed. In one or more embodiments, the signal characteristics include a ratio of upper side band to lower side band subcarrier frequency amplitudes. In this way, the estimated detuning from a reference system may easily be determined, which in turn enables controlling a transmission carrier phase for active load modulation. This, in turn, further increases the reliability of the communication. In one or more embodiments, the signal characteristics include a ratio of an amplitude of a subcarrier signal to an amplitude of the third harmonic of said subcarrier signal. This signal characteristic may be indicative of the pulse shape of the external communication device. Thus, the communication device may easily be reconfigured in order to adequately process said pulse shape, and thus to increase the reliability of the communication. In a practical implementation, the configuration settings are stored in a look-up table within the communication device.

Figure 2:
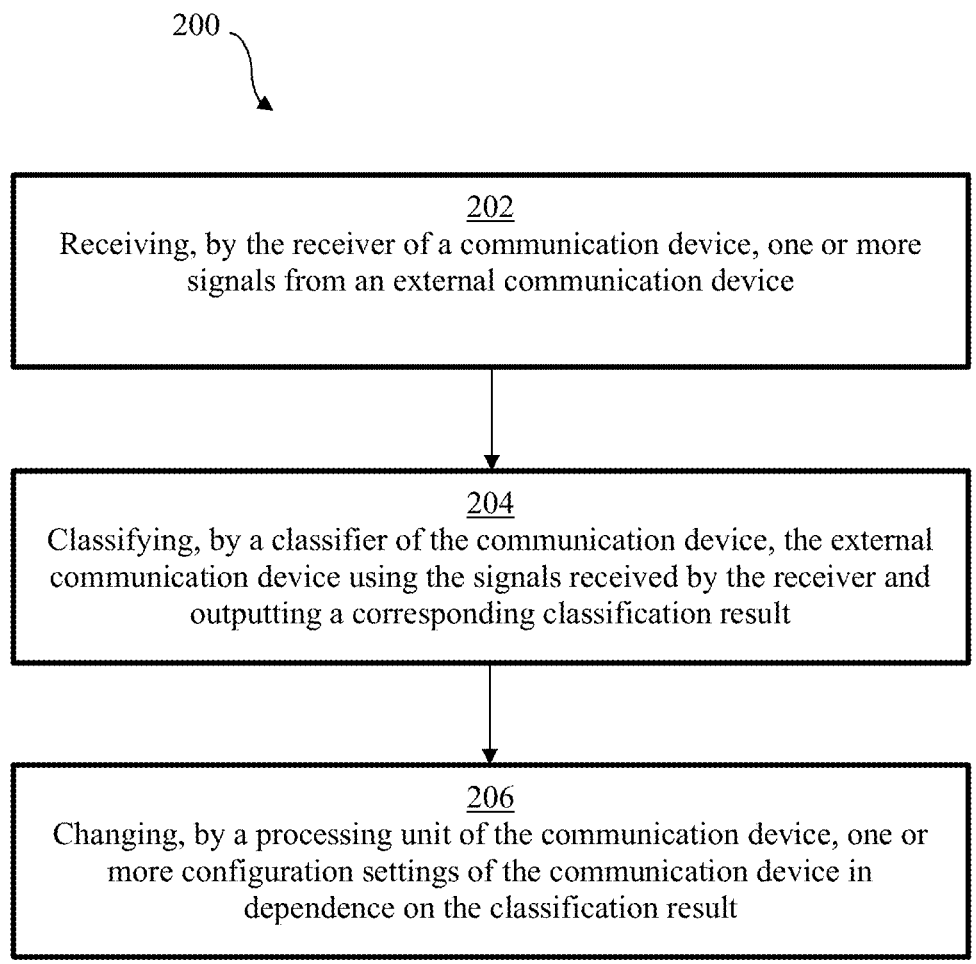
FIG. 2 shows an illustrative embodiment of a method of operating a communication device.

FIG. 2 shows an illustrative embodiment of a method 200 of operating a communication device. The method 200 comprises the following steps. At 202, a receiver of a communication device receives one or more signals from an external communication device. At 204, a classifier of the communication device classifies the external communication device using the signals received by the receiver and outputs a corresponding classification result. Furthermore, at 206, a processing unit of the communication device changes one or more configuration settings of the communication device in dependence on the classification result. As mentioned above, in this way, the communication device can easily be configured in dependence of the type of external communication device with which communication is established. This, in turn, facilitates reducing the risk of failed communication cycles, and thus facilitates increasing the reliability of the communication between the two devices.

Thus, to reduce the probability of failed communication attempts, a method in accordance with the present disclosure may include two steps. After the communication link between a PCD and a PICCED is established by bringing the PICCED into the PCD's RF field, the PICCED first classifies the PCD based on the received signal. Then, in a second step, the PICCED optimizes its configuration (e.g., modem settings, equalizer initialization, decoder settings) based on the classification result. In particular, this second step may compensate for properties of certain PCD classes that can impair communication. Furthermore, in accordance with the present disclosure, a PICCED may already be configured during the first command that is being sent by the PCD. Hence, any further information exchange between PCD and PICCED benefits from the optimized configuration, which results in a more reliable communication. It is noted that this step may be particularly useful in active load modulation (ALM) applications, where the PICCED actively transmits a signal and hence the transmitter configuration plays an important role.

An ad-hoc solution would be to optimize the configuration of the PICCED for individual reader terminals. However, this approach is not likely to succeed as (1) one would need to characterize all existing reader devices and (2) the memory needed to store all configurations would probably exceed the available memory on a mobile phone. In contrast, in accordance with the present disclosure, the configuration of the PICCED may be optimized for different classes (i.e., types) of readers. Since the number of reader classes may be significantly smaller than the total number of individual readers, this approach is more likely to succeed.

Figure 3:
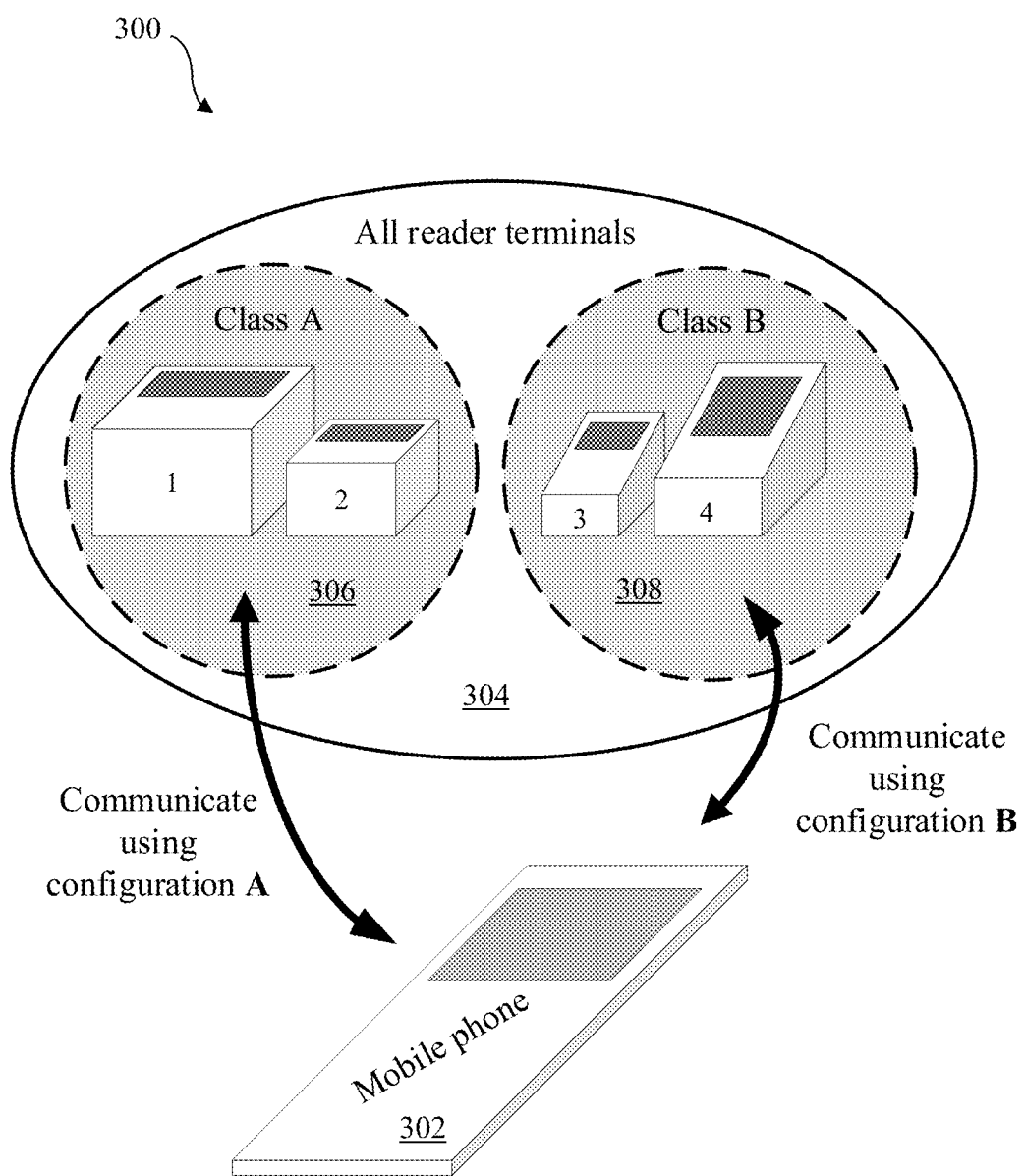
FIG. 3 shows an illustrative embodiment of a near field communication system.

FIG. 3 shows an illustrative embodiment of a near field communication system 300. In particular, a classification is shown based on two classes 306, 308 which form subsets of the population of all reader terminals 304, together with the intended communication behavior. Accordingly, a mobile phone 302 may configure itself in dependence on the type of reader with its antenna is coupled, as reflected by the result of the classification operation performed by the classifier of the mobile phone 302.

It is noted that the different reader classes and the associated optimal configurations may be determined using different approaches. For example, data-driven approaches and analytical approaches may be applied for this purpose. In data-driven approaches, measurements may be performed and discriminating information (i.e., signal characteristics or features) may be extracted by manual data analysis, computational methods, or by a combination of manual data analysis and computational methods. Examples of such computational methods include linear discriminant analysis, multidimensional discriminant analysis, neural networks, or principal component analysis. In analytical approaches, prior knowledge may be incorporated about, for example, matching topologies, antenna designs and decoder architectures, and about the effects of these system characteristics on transmission and reception, in order to model the classifier as well as the optimal configuration adaptation. These approaches are not mutually exclusive; in some cases a combination of data-driven and analytical approaches may be regarded as the best choice. As an example, the proposed method may be combined with a transmission carrier phase control concept, according to which the carrier phase is controlled in dependence on an estimated resonance frequency and a pre-trained reference system. This approach may be used to select between different reference systems, in dependence on the reader classification result.

Figure 4:
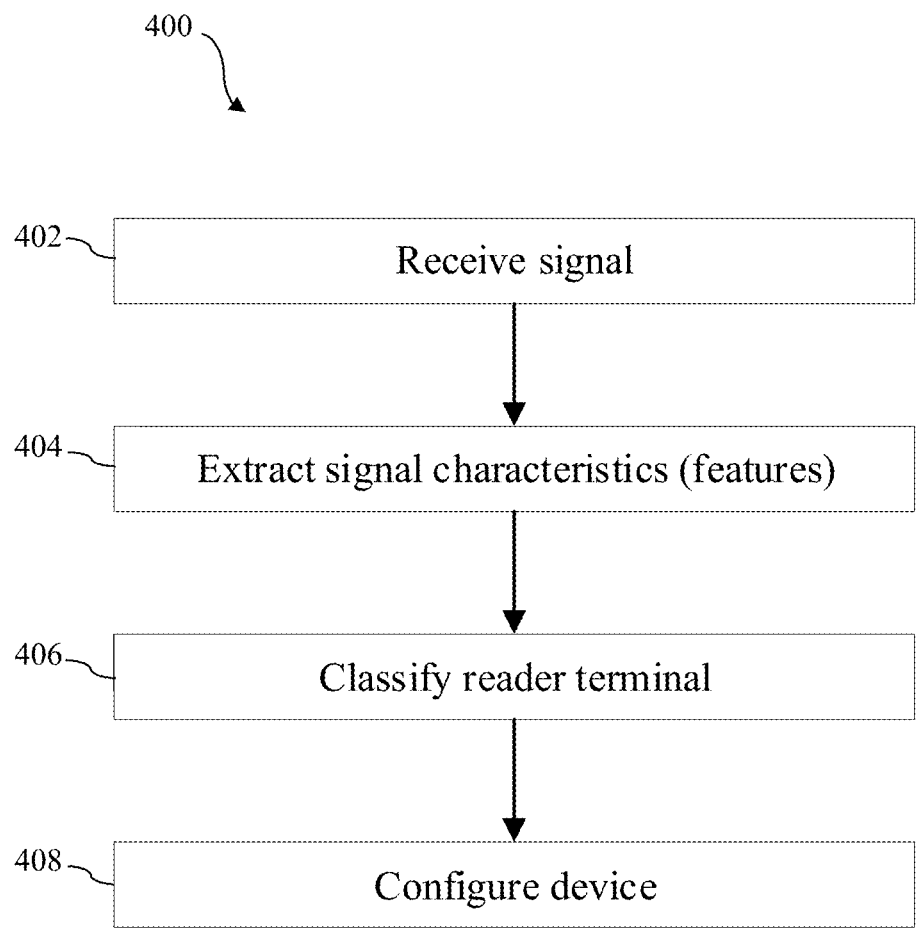
FIG. 4 shows another illustrative embodiment of a method of operating a communication device.

FIG. 4 shows another illustrative embodiment of a method 400 of operating a communication device. The method 400 comprises the steps of receiving a signal 402, extracting signal characteristics (i.e., features) 404, classifying the reader terminal 406, and configuring the device 408. In particular, examples are shown of individual steps for performing the reader classification and the optimal device configuration. After the signal samples are received 402, signal features are extracted 404 from these samples, the reader terminal is classified 406, and the NFC-enabled device is configured 408 accordingly.

Figure 5:
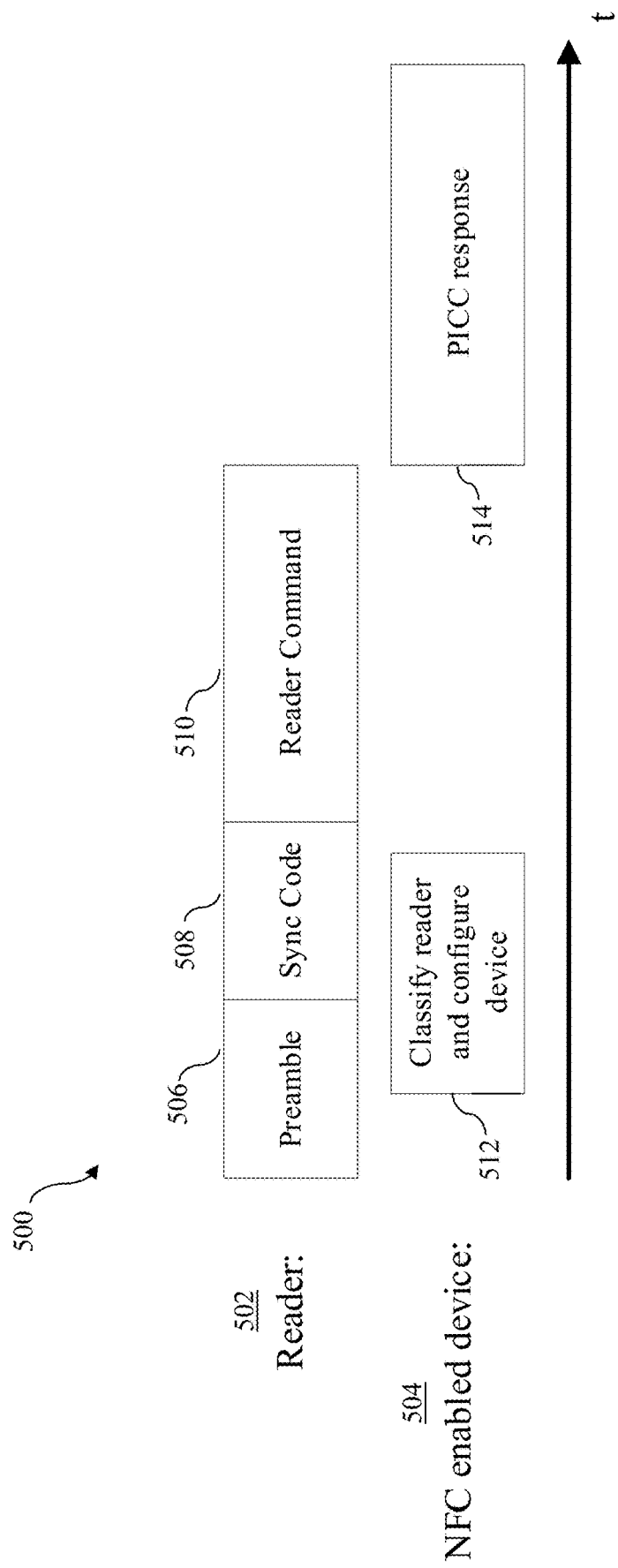
FIG. 5 shows an illustrative embodiment of a timing diagram.

FIG. 5 shows an illustrative embodiment of a timing diagram 500. A reader transmits a command message, which includes a preamble 506, a synchronization (sync) code 508 and a reader command 510. The reader command 510 forms the payload of the command message. In accordance with the present disclosure, an NFC-enabled device may classify 512 the reader and configure or reconfigure itself in dependence on the classification result within a period during which the preamble 506 and the sync code 508 of the command message are received. After the command message has been received and process, the NFC-enabled device 504, which is PICC in the present example, may respond 514 to the command message. The timing diagram 500 is based on the FeliCa protocol, but the presently disclosed approach is generic in the sense that it may be applied to any type of suitable protocol, for example to Type A/B, ICODE, or other protocols. Ideally, as shown in this example, the processing 512 (i.e., the classification of the reader and the configuration of the device) is finalized before the reader command 510 begins. Thus, only a limited amount of time may be needed for both the extraction of the features and the classification based on these features.

The following features may be extracted with a low computational complexity: the received signal strength indicator (RSSI); the ratio of upper and lower side band subcarrier frequency amplitudes, which is indicative of the asymmetry of the baseband spectrum that can be linked to detuning effects; the ratio of the subcarrier amplitude and the amplitude of the subcarrier's third harmonic, which is indicative of the pulse shape of a reader. It is noted that other features may be used in addition, but physical interpretability may help to avoid overfitting. Furthermore, the number of features is not restricted. The optimal configurations for the reader classes can be stored in a look-up table (LUT). The LUT size is proportional to the number of reader classes that are defined. Furthermore, the processing 512 may be applied once before the first reader command, before a plurality of selected reader commands or before each reader command. Accordingly, multiple classifier outputs may be merged, e.g. using a probabilistic approach, which may help to increase the accuracy of the classification result.

Figure 6:
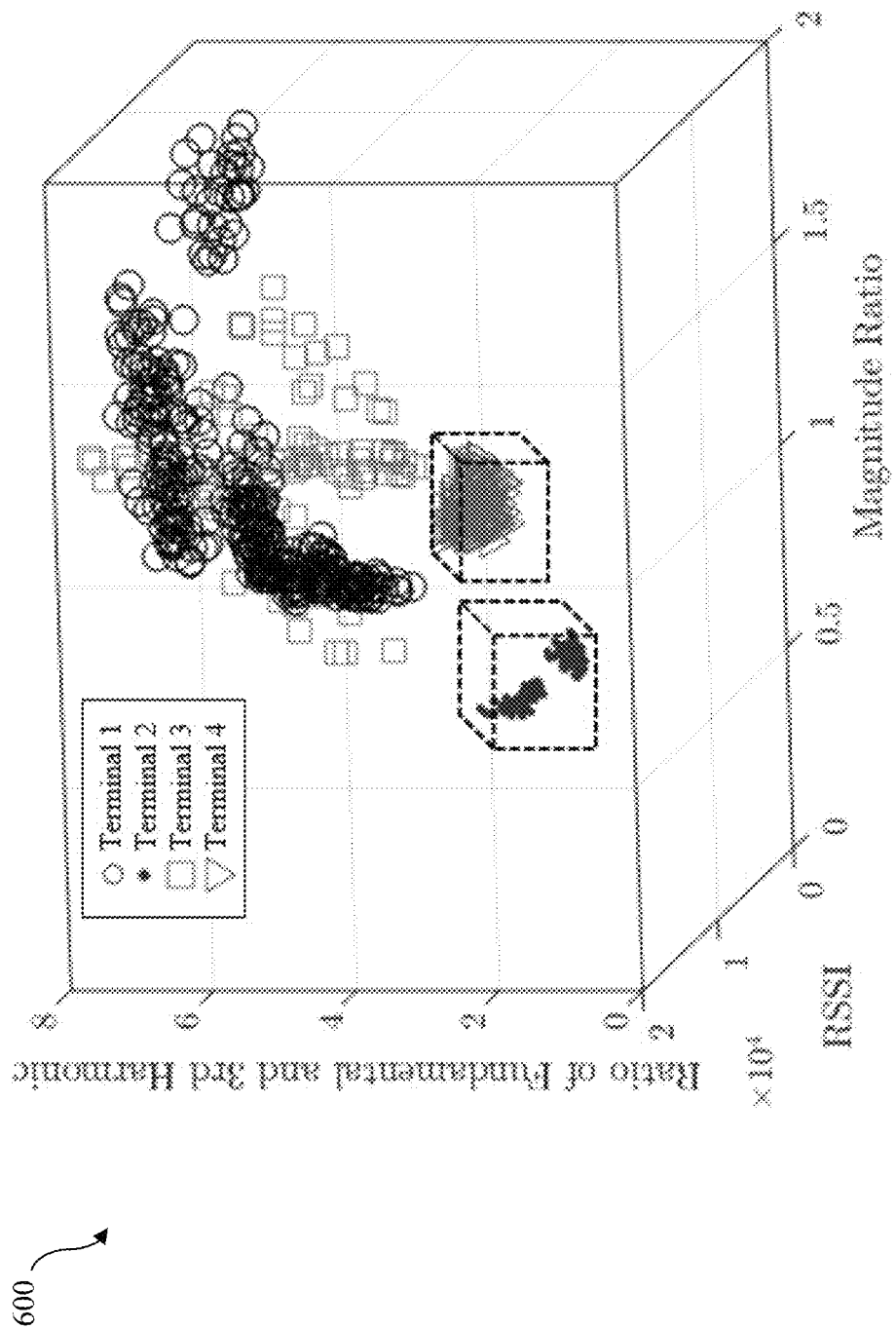
FIG. 6 shows illustrative embodiments of feature-space representations of different terminals.

FIG. 6 shows illustrative embodiments of feature-space representations 600 of different terminals. In particular, feature-space representations 600 are shown for four terminals. The datapoints correspond to real-world measurements, captured following the timing constraints derived from FIG. 5. The reader terminals have been measured at distances ranging from 30 mm to 0 mm and with different orientations of the antenna of the device under test (DUT) to the reader antennas. It can be seen that terminal 1 and terminal 3 occupy similar regions in the feature space, while terminal 2 and 4 form separated point clouds. This is indicated by the cubes or bounding boxes around their point clouds. In a practical implementation, these bounding boxes may be represented by limits for the RSSI, ratio of the upper and lower sideband, and ratio of the fundamental and third harmonic. In some cases, using a single feature such as the RSSI might suffice, but in the shown example using only the RSSI would not provide sufficient separability of the terminals in the feature space. Accordingly, a combination of features is used. In the field, the DUT would (1) measure the features, (2) evaluate the measurement data point position in the feature space (i.e., check if it lies within one of the bounding boxes), and (3) decide how to configure its settings based on the result of step (2). Given the measurement data for the four terminals in FIG. 4, it would not be necessary to find a configuration that is optimal for all four terminals, but only for the subclasses{terminal 1, terminal 3} and {terminal 2}, {terminal 4}. It is noted that it is easier to configure a device to perform well with only one counterpart or two counterparts than to optimize it for all four counterparts simultaneously.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication device
102 receiver
104 classifier
106 processing unit
200 method of operating a communication device 202 receiving, by the receiver of a communication device, one or more signals from an external communication device 204 classifying, by a classifier of the communication device, the external communication device using the signals received by the receiver and outputting a corresponding classification result 206 changing, by a processing unit of the communication device, one or more configuration settings of the communication device in dependence on the classification result 300 near field communication system 302 mobile phone 304 all reader terminals 306 class A 308 class B 400 method of operating a communication device 402 receive signal 404 extract signal characteristics (features)

406 classify reader terminal 408 configure device 500 timing diagram 502 reader

504 NFC-enabled device 506 preamble 508 synchronization (SYNC) code 510 reader command 512 classify reader and configure device 514 proximity integrated circuit card (PICC) response 600 feature-space representations of different terminals

The invention claimed is:

1. A communication device, comprising:
a receiver configured to receive, by an antenna of the receiver, one or more radio frequency signals from an external communication device that does not form a part of the communication device;
a classifier configured
to extract one or more signal amplitude characteristics from the one or more radio frequency signals,
to classify the external communication device based on the one or more signal amplitude characteristics of the one or more radio frequency signals received by the receiver, and
to output a corresponding classification result that indicates a type of the external communication device as one of multiple types of communication devices; and
a processing unit configured to change one or more configuration settings of the communication device in dependence on the classification result.

2. The communication device of claim 1, wherein the configuration settings include at least one of the group of modem settings, equalizer initialization settings and decoder settings.

3. The communication device of claim 1, wherein the one or more radio frequency signals include a first command message, and the classifier is configured to classify the external communication device and the processing unit is configured to change the configuration settings within a period during which the first command message is received from the external communication device in accordance with a predefined communication protocol.

4. The communication device of claim 3, wherein the classifier is configured to classify the external communication device and the processing unit is configured to change the configuration settings within a period during which a preamble and a synchronization code of the first command message are received.

5. The communication device of claim 1, wherein the signal amplitude characteristics include a received signal strength indicator.

6. The communication device of claim 1, wherein the signal amplitude characteristics include a ratio of upper side band to lower side band subcarrier frequency amplitudes.

7. The communication device of claim 1, wherein the signal amplitude characteristics include a ratio of an amplitude of a subcarrier signal to an amplitude of a third harmonic of said subcarrier signal.

8. The communication device of claim 1, wherein the configuration settings are stored in a look-up table within the communication device that stores configuration settings for the multiple types of communication devices, and wherein the configuration settings are selected from modem settings, equalizer initialization settings, and decoder settings.

9. The communication device of claim 1, being a proximity integrated circuit card or a proximity integrated circuit card emulating device.

10. A method of operating a communication device, the communication device comprising a receiver, a classifier and a processing unit, the method comprising:
receiving, by an antenna of the receiver, one or more radio frequency signals from an external communication device that does not form a part of the communication device;
extracting one or more signal amplitude characteristics from the one or more radio frequency signals;
classifying, by the classifier, the external communication device based on the one or more signal amplitude characteristics of the one or more radio frequency signals received by the receiver;
outputting a corresponding classification result that indicates a type of the external communication device as one of multiple types of communication devices; and
changing, by the processing unit, one or more configuration settings of the communication device in dependence on the classification result.

11. The method of claim 10, wherein the configuration settings include at least one of the group of modem settings, equalizer initialization settings and decoder settings.

12. The method of claim 10, wherein the classifier classifies the external communication device and the processing unit changes the configuration settings within a period during which a first command message is received from the external communication device in accordance with a predefined communication protocol.

13. The method of claim 12, wherein the classifier classifies the external communication device and the processing unit changes the configuration settings within a period during which a preamble and a synchronization code of the first command message are received.

14. The method of claim 10, wherein the signal amplitude characteristics include a received signal strength indicator.

15. The method of claim 10, wherein the signal amplitude characteristics include a ratio of upper side band to lower side band subcarrier frequency amplitudes.

16. The method of claim 10, wherein the signal amplitude characteristics include a ratio of an amplitude of a subcarrier signal to an amplitude of a third harmonic of said subcarrier signal.

17. The method of claim 10, wherein the configuration settings are stored in a look-up table within the communication device that stores configuration settings for the multiple types of communication devices, and wherein the configuration settings are selected from modem settings, equalizer initialization settings, and decoder settings.

18. A near field communication device, comprising:
- a receiver configured to receive, by an antenna of the near field communication device, a message from an external near field communication reader that does not form a part of the near field communication device;
- a classifier configured
  - to extract one or more signal amplitude characteristics from the message,
  - to classify the external near field communication reader based on the one or more signal amplitude characteristics of the message, and
  - to output a corresponding classification result that indicates a type of the external near field communication reader as one of multiple types of near field communication readers; and
- a processing unit configured to change one or more configuration settings of the near field communication device in dependence on the classification result.

19. The near field communication device of claim 18, wherein the signal amplitude characteristics are selected from a received signal strength indicator, a ratio of upper side band to lower side band subcarrier frequency amplitudes, and a ratio of an amplitude of a subcarrier signal to an amplitude of a third harmonic of the subcarrier signal.

20. The near field communication device of claim 18, wherein the configuration settings are stored in a look-up table within the communication device that stores configuration settings for the multiple types of near field communication readers, and wherein the configuration settings are selected from modem settings, equalizer initialization settings, and decoder settings.

* * * * *